United States Patent
Berg et al.

[11] Patent Number: 5,641,177
[45] Date of Patent: Jun. 24, 1997

[54] INTERNAL CLADDING MEMBER

[75] Inventors: Matthias Berg, Kempen; Hartmut Harnisch, Grefrath; Steven Madge, Krefeld; Werner Reinhardt, Rüsselsheim, all of Germany

[73] Assignee: Deutsche Fibrit Gesellschaft Ebers & Dr. Müller mbH, Grefrath, Germany

[21] Appl. No.: 443,903

[22] Filed: May 17, 1995

[30] Foreign Application Priority Data

May 25, 1994 [DE] Germany ............ 44 18 172.8

[51] Int. Cl.$^6$ .................................. B60R 21/16
[52] U.S. Cl. ..................... 280/728.3; 280/732
[58] Field of Search ................ 280/728.3, 732, 280/728.1

[56] References Cited

U.S. PATENT DOCUMENTS

| | | | |
|---|---|---|---|
| 4,995,638 | 2/1991 | Shinto et al. | 280/731 |
| 5,222,760 | 6/1993 | Lafferty | 280/728.3 X |
| 5,372,379 | 12/1994 | Parker | 280/728.3 |
| 5,421,608 | 6/1995 | Parker et al. | 280/732 X |
| 5,447,327 | 9/1995 | Jarboe et al. | 280/732 X |
| 5,447,328 | 9/1995 | Iannazzi et al. | 280/728.3 |
| 5,451,074 | 9/1995 | Guitariui | 280/728.3 |
| 5,487,558 | 1/1996 | Ball et al. | 280/728.3 |

FOREIGN PATENT DOCUMENTS

| | | |
|---|---|---|
| 2045245 | 5/1971 | Germany . |
| 2052357 | 4/1972 | Germany . |
| 4301445A1 | 9/1993 | Germany . |
| 4233749C2 | 4/1994 | Germany . |
| 5-92745 | 4/1993 | Japan . |

*Primary Examiner*—Christopher P. Ellis
*Attorney, Agent, or Firm*—Meltzer, Lippe, Goldstein et al.

[57] ABSTRACT

The invention relates to an internal cladding member, more particularly a motor vehicle dashboard comprising a support which is lined with a foil coated with cellular material and which has for the emergence of an airbag on its release a flap integral with the support and covered by the foil, which has an impressed groove along the edges of the flap. The characterizing feature of the invention is that the joint separating the flap from the support over a portion of its periphery is narrower than 1.5 mm and the foil is weakened in the zone of the joint.

13 Claims, 1 Drawing Sheet

INTERNAL CLADDING MEMBER

FIELD OF THE INVENTION

The invention relates to an internal cladding member, more particularly to an internal cladding member in the form of a motor vehicle dashboard comprising a support which is lined with a foil coated with cellular material and which has for the emergence of an airbag on its release a flap unitarily connected to integral with the support and covered by the foil, which has an impressed groove along the edges of the flap.

BACKGROUND OF THE INVENTION

Hitherto the dashboard support has been formed with a recess through which the airbag emerges in a collision, to protect the passenger of a motor vehicle. The recess was closed by a flap attached via a hinge to the dashboard support at the edge of the recess. The flap was covered by the lining of the dashboard with a plastic foil coated with cellular material. The known method had the disadvantage that the flap had to be produced and assembled as an additional member, something which was costly in labour and money.

To obviate this disadvantage, a flap has already been produced as an integral component of the dashboard support, but this has hitherto been successful only with a construction having a layer of cellular material under the foil, so that the foil lining is not pulled into the joint between the dashboard support and the flap, as is the case with thin foil linings drawn by vacuum on to the support.

It is an object of the invention to provide a construction for an internal cladding member, such as a dashboard or a side door cladding of a motor vehicle, wherein the flap for the recess for the emergence of the airbag in case of danger is unitary with the support of the internal cladding member but also allows a thin foil which is applied by vacuum to the support. At the same time, the thin foil must not be pulled into the joint between the flap and the support, but must cover the joint smoothly.

SUMMARY OF THE INVENTION

To solve this problem, in the manner as described in the preamble according to the invention the joint separating the flap from the support over a portion of its periphery is narrower than 0.8 mm and the foil is weakened in the zone of the joint.

Preferred embodiments are characterized in the subclaims. The aim is to have a joint as narrow as possible, less than 0.5 mm, and even better less than 0.3 mm in width. If the sectional plane of the joint lies at an angle differing from 90° to the plane of the support, the flap edge can even bear jointlessly against the edge of the support. The best thing is to have an angle in the range of 30° to 60°, preferably approximately 45°.

The support for the internal cladding member can be made of any desired material, but is preferably made from mould-pressed defibrated fibrous material.

The foil coated with cellular material, which is applied by vacuum to the support, can preferably have a total thickness of 2 to 3 mm.

For the sake of safety, according to a preferred embodiment of the invention the web between the flap and the support is reinforced by a glued-on strip of flexible tear-resistant material. When the airbag is released, said strip prevents the flap from being broken off the support and hurled towards and injuring the passenger.

To facilitate the passage and emergence of the airbag, the foil should be formed along the joint with an impressed groove of reduced thickness which facilitates the tearing-open of the foil when the flap is opened.

An embodiment of the invention is illustrated in drawings.

DETAILED DESCRIPTION OF THE INVENTION

Figure 1:
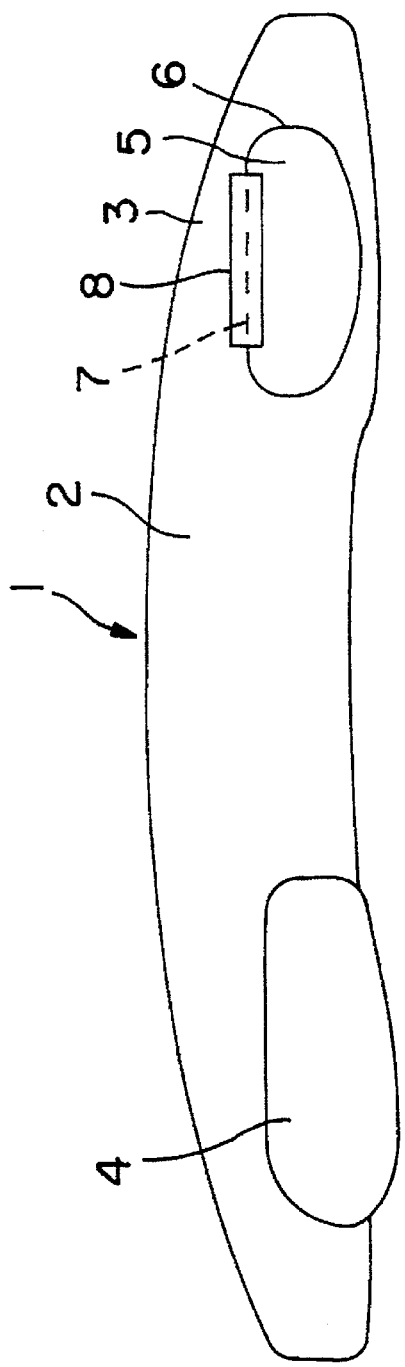
FIG. 1 is a schematic plan view of a motor vehicle dashboard.
Figure 2:
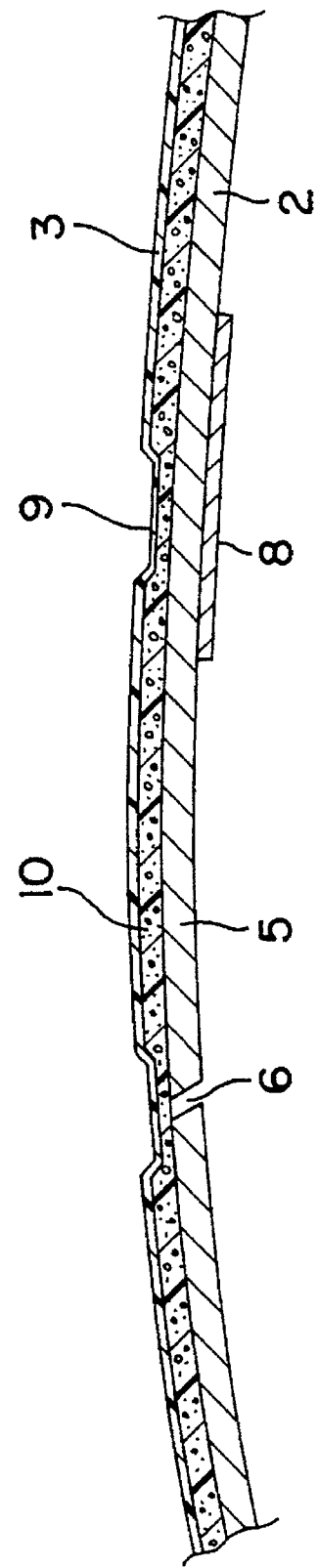
FIG. 2 is a partial schematic cross-section taken along the passenger's side of the dashboard shown in FIG. 1.

Referring to FIGS. 1 and 2, there is illustrated an internal cladding member in the form of a motor vehicle dashboard 1 comprises a support 2 coated with a foil 3 coated with cellular material 10, wherein the cellular material is located on the support 2. An arching 4 for accommodating the instruments can be seen on the driver's side. Disposed on the passenger side is a flap 5 which is formed in one piece, i.e., unitarily with the support 2 and is supported therefrom over a portion of its periphery by a joint 6. The web 7 between the flap 5 and the support 2 is reinforced by a glued-on strip 8 of flexible tear-resistant material. According to the inventor the joint 6 is narrower than 1.5 mm and the foil 3 is weakened in the zone of the joint.

As illustrated in FIG. 2, the foil 3 is weakened by an impressed groove 9 along the edges of the flap 5. The groove 9, which facilitates the tearing-open of the foil 3 when the flap 5 is opened, can be produced by any suitable stamping device. Additionally, the foil may by provided with a hidden weakening in the form of small recesses located side-by-side at the inner surface of the foil 3 along the joint 6. The support 2 consists of a contoured pressing. It is preferably made from mold-pressed defibrated fibrous material such as vegetable fibers and/or plastic fibers adhered with one another by a suitable binding agent.

The dashboard 1 is produced in such a way that the foil 3 coated with cellular material 10 is glued to the support 2 by applying it with vacuum thereto. Since the joint 6 is narrower than 1.5 mm the foil 3 coated with cellular material, which can preferably have a total thickness of 2 to 3 mm, will not be pulled into the joint 6 which might result in a creased appearance at the outer surface of the foil facing to the passenger compartment. The joint should be as narrow as possible, preferably less than 0.5 mm, or even better less than 0.3 mm in width.

As shown in FIG. 2, the joint 6 is formed by a cut at an angle which is less than 90°, approximately at an angle of 60°.

In the embodiment illustrated in the drawings the flap 5 is provided in the dashboard 1, but it might equally well be disposed in the side door cladding, if the airbag for the driver and/or the passenger should be accommodated at that place.

While the preferred embodiment has been chosen to illustrate the invention, it will be understood by those skilled in the art that various changes and modifications can be made herein without departing from the scope or spirit of the invention as defined in the appended claims.

What is claimed is:

1. An internal cladding member for a motor vehicle, comprising:

a support;

a flap, unitarily connected to said support, which covers an enclosed airbag;

a joint circumscribing said flap for separating said flap from said support; and a foil coated with cellular material which covers said support, said flap, and said joint, wherein the coated foil has an impressed groove along the edges of said flap so that it is positioned above said joint.

2. The internal cladding member of claim 1, wherein the width of said joint is less than 1.5 mm.

3. The internal cladding member of claim 1, wherein the width of said joint is less than 0.5 mm.

4. The internal cladding member of claim 1, wherein the width of said joint is less than 0.3 mm.

5. The internal cladding member of claim 1, wherein the sectional plane of said joint lies at an angle of approximately 90° to the plane of said support.

6. The internal cladding member of claim 1, wherein the sectional plane of said joint lies at an angle less than 90° to the plane of said support.

7. The internal cladding member of claim 1, wherein the sectional plane of said joint lies at an angle less than 45° to the plane of said support.

8. The internal cladding member of claim 1, wherein said support is formed of pressed defibrated fibrous material.

9. The internal cladding member of claim 1, wherein said coated foil is glued to said support.

10. The internal cladding member of claim 9, wherein the thickness of said coated foil ranges approximately between 2 and 3 mm.

11. The internal cladding member of claim 1 further comprising a web positioned between said flap and said support, said web being reinforced by a glued-on strip of flexible tear-resistant material.

12. The internal cladding member of claim 1, wherein the thickness of said groove is less than the thickness of said foil.

13. The internal cladding member of claim 1, wherein said internal cladding member is one of a vehicle dashboard and a side door cladding.

* * * * *